(12) United States Patent
Stees

(10) Patent No.: US 11,900,268 B1
(45) Date of Patent: Feb. 13, 2024

(54) SYSTEM AND METHODS FOR MODULAR COMPLETION OF A PECUNIARY-RELATED ACTIVITY

(71) Applicant: Laura A. Stees, San Diego, CA (US)

(72) Inventor: Laura A. Stees, San Diego, CA (US)

(73) Assignee: Laura A. Stees

( * ) Notice: Subject to any disclaimer, the term of this patent is extended or adjusted under 35 U.S.C. 154(b) by 0 days.

(21) Appl. No.: 18/106,263

(22) Filed: Feb. 6, 2023

(51) Int. Cl.
*G06N 5/022* (2023.01)

(52) U.S. Cl.
CPC .................................. *G06N 5/022* (2013.01)

(58) Field of Classification Search
CPC .......... G06N 5/022; G06N 5/025; G06N 5/04; G06N 20/00; G06N 20/10; G06N 20/20
See application file for complete search history.

(56) References Cited

U.S. PATENT DOCUMENTS

| | | |
|---|---|---|
| 10,424,020 B2 | 9/2019 | Kmak |
| 11,301,764 B1 | 4/2022 | Wendel |
| 2019/0026836 A1 | 1/2019 | Milkovich |
| 2020/0104763 A1 | 4/2020 | Carney |
| 2020/0302552 A1* | 9/2020 | Rephlo .................. G06Q 40/12 |
| 2022/0036450 A1* | 2/2022 | Sanghvi ................ G06N 5/043 |

* cited by examiner

*Primary Examiner* — Shane D Woolwine
(74) *Attorney, Agent, or Firm* — Caldwell Intellectual Property Law

(57) ABSTRACT

An apparatus for an apparatus for modular completion of a pecuniary-related activity is disclosed. The apparatus includes at least a processor; and a memory communicatively connected to the at least a processor. The memory containing instructions configuring the at least a processor to receive a user profile from a user for a pecuniary-related activity, the user profile having at least a user target, obtain a plurality of pecuniary approach blocks, select at least one pecuniary approach block from the plurality of pecuniary approach blocks as a function of the user profile and generate at least one pecuniary plan as a function of the at least one pecuniary approach block and the user profile. Apparatus further includes a user interface communicatively connected to the processor, the user interface configured to display the at least one pecuniary plan.

18 Claims, 7 Drawing Sheets

SYSTEM AND METHODS FOR MODULAR COMPLETION OF A PECUNIARY-RELATED ACTIVITY

FIELD OF THE INVENTION

The present invention generally relates to the field of pecuniary-related activities. In particular, the present invention is directed to modular completion of a pecuniary-related activity using a computing device.

BACKGROUND

At present, methods related to pecuniary-related activities which connect user information to specific steps or objectives are underdeveloped. Currently, pecuniary-related activities using a computing device only provide activities for a general audience and not specific individuals. Existing solutions for providing specific pecuniary-related activities are costly, inefficient, and prone to human error.

SUMMARY OF THE DISCLOSURE

In an aspect, an apparatus for modular completion of a pecuniary-related activity comprises at least a processor and a memory communicatively connected to the at least a processor. The memory contains instructions configuring the at least a processor to receive a user profile from a user for a pecuniary-related activity, the user profile having at least a user target. Memory contains instructions to obtain a plurality of pecuniary approach blocks and select at least one pecuniary approach block from the plurality of pecuniary approach blocks as a function of the user profile. Memory further contains instructions to generate at least one pecuniary plan as a function of the at least one pecuniary approach block and the user profile. Apparatus further comprises a user interface communicatively connected to the processor, the user interface configured to display the at least one pecuniary plan.

In another aspect a method for modular completion of a pecuniary-related activity comprises receiving, by at least a processor, a user profile from a user for a pecuniary-related activity, the user profile having at least a user target. The method further comprises, obtaining, by at least the processor, a plurality of pecuniary approach blocks and selecting, by the at least a processor, at least one pecuniary approach block from the plurality of pecuniary approach blocks as a function of the user profile. The method further comprises generating, by the at least a processor, at least one pecuniary plan as a function of the at least one pecuniary approach block and the user profile. The method then comprises displaying, by the at least a processor, the at least one pecuniary plan on a user interface.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for modular completion of a pecuniary-related activity. In an aspect this disclosure can be used to obtain a pecuniary plan for a user using a user profile. Aspects of this disclosure can also be used to determine pecuniary health scores or generate pecuniary predictions. This may be so at least in part, by utilizing a machine-learning model. Exemplary embodiments illustrating aspects of the present disclosure are described below in the context of several specific examples.

Figure 1:
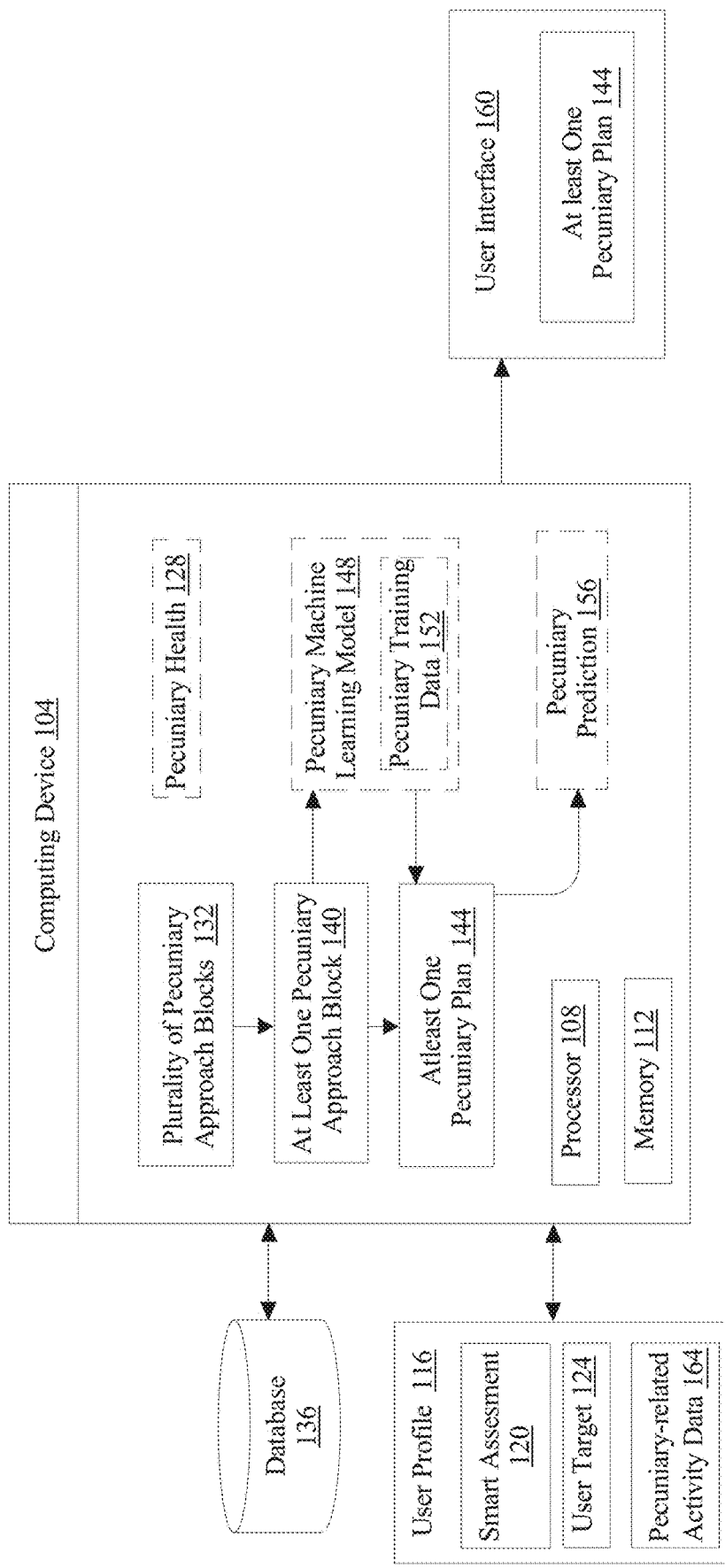
FIG. 1 is a block diagram of an exemplary embodiment of an apparatus for modular completion of pecuniary-related activity.

Referring now to FIG. 1, an exemplary embodiment of an apparatus 100 for modular completion of a pecuniary-related activity is illustrated. Apparatus 100 includes a computing device 104. Computing device 104 may be designed and/or configured to perform any method, method step, or sequence of method steps in any embodiment described in this disclosure, in any order and with any degree of repetition. For instance, a computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Apparatus 100 includes a processor 108. Processor 108 may include any computing device as described in this disclosure, including without limitation a microcontroller, microprocessor, digital signal processor (DSP) and/or system on a chip (SoC) as described in this disclosure. Computing device 104 may include, be included in, and/or communicate with a mobile device such as a mobile telephone or smartphone. Processor 108 may include a single computing device operating independently, or may include two or more computing device operating in concert, in parallel, sequentially or the like; two or more computing devices may be included together in a single computing device or in two or more computing devices. Processor 108 may interface or communicate with one or more additional devices as described below in further detail via a network interface device. Network interface device may be utilized for connecting Processor 108 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 108 may include but is not limited to, for example, a computing device or cluster of computing devices in a first location and a second computing device or cluster of computing devices in a second location. Processor 108 may include one or more computing devices dedicated to data storage, security, distribution of traffic for load balancing, and the like. Processor 108 may distribute one or more computing tasks as described below across a plurality of computing devices of computing device, which may operate in parallel, in series, redundantly, or in any other manner used for distribution of tasks or memory between computing devices. Processor 108 may be implemented using a "shared nothing" architecture in which data is cached at the worker, in an embodiment, this may enable scalability of system 100 and/or computing device.

Still referring to FIG. 1, processor 108 may be designed and/or configured to perform any method, method step, or sequence of method steps in any embodiment described in this disclosure, in any order and with any degree of repetition. For instance, processor 108 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. processor 108 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, apparatus 100 contains a memory 112 communicatively connected to at least a processor 108. As used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, processor 108 may perform determinations, classification, and/or analysis steps, methods, processes, or the like as described in this disclosure using machine-learning processes. A "machine-learning process," as used in this disclosure, is a process that automatedly uses a body of data known as "training data" and/or a "training set" (described further below in this disclosure) to generate an algorithm that will be performed by a processor/module to produce outputs given data provided as inputs; this is in contrast to a non-machine learning software program where the commands to be executed are determined in advance by a user and written in a programming language. A machine-learning process may utilize supervised, unsupervised, lazy-learning processes and/or neural networks, described further below Still referring to FIG. 1, memory 112 contains instructions configuring Processor 108 to receive a user profile 116 from a user for a pecuniary-related activity. A "user profile" as defined in this disclosure is a data structure containing user related data such as, and without limitation, personal information (e.g., name, age, gender, address, and the like), family information (e.g., number of dependents, dependents information, marital status, and the like), profession information (e.g., employer/employee, annual income, taxes deducted from income, benefits given with the job, job title, and the like), and the like thereof. For example, user profile 116 may include the name of a user or the income of a user. User profile 116 may contain a non-linear data structure such as a tree to store data. A "tree" as defined in this disclosure is a multilevel data structure with a hierarchical relationship among its elements. A tree can be used to sort data into multiple categories. For example, user profile 115 may contain a tree data structure such that any data relating to profession information within user profile 116 is categorized under the profession information category. User profile 116 may further include, without limitation, pecuniary-related activity data 164. "Pecuniary-related activity" as described in this disclosure is an activity relating to or involving money. For example, a pecuniary-related activity may include tax preparation, debt management, investing, stock purchasing, purchase of a car or a house and the like. Pecuniary-related activity data 164 may include, without limitation, data such as financial obligation information (e.g. rent expenses, grocery expenses, medical expenses, utility expenses, transportation expenses, insurance, family vacations, educational expenses, loans, family expenses, mortgages and the like), Asset information (Stocks, dividends, bonds, rental properties, income from real property and intellectual property and the like) and the like thereof. A "user" as defined in this disclosure refers to any individual, groups of individuals or entity that may be seeking modular completion of a pecuniary-related activity. User may include an individual, multiple family members, a family, a partnership, a business entity, a joint venture and the like. In some embodiments, user profile 116 may be related to a business and contain business information. For example, employer information, transactional data of a business, number of years business has been established, number of deposits per month in a business bank account, monthly revenue, average daily bank balance, credit history/report of a business, business registration details, government activity summary, company information (i.e., employees, sales, ownership, and subsidiaries), data relating to business operations, industry classification and data, public filings (i.e., liens, judgments, and UCC filings), past payment history and collections related to a business, number of accounts (i.e., credit, checking, savings), account details, and the like. User profile 116 includes a user target 124. "User target" as described in this disclosure may be any pecuniary-related goal in which a user seeks to gain as a result of the completion of the pecuniary-related activities. For example, a user target 124 may include a reduction in tax payments or minimizing expenses. User target 124 may include without limitation, build saving, optimizing deductions, minimizing expenses, increasing net worth, increasing residual income, minimizing tax payments, and the like thereof.

Still referring to FIG. 1, user profile 116 may be received through a remote device. For the purposes of this disclosure, a "remote device" is a device located remote to apparatus. Remote device may include a user device, such as, for example, a customer device. Remote device may include a smartphone, mobile phone, laptop computer, desktop computer, tablet, any of computing device and/or system described in this disclosure, and the like. Remote device may include input device as described below.

Still referring to FIG. 1, user profile 116 may be received through a manual input by the user. User may input values directly into a computing device similar to one described in this disclosure. User may further submit files, documents, still or moving images, and the like thereof as part of a data submission for the user profile 116. As used in this disclosure, a "data submission" is an assemblage of data provided by the user as an input source. In a non-limiting example, data submission may include user uploading one or more photos to processor 108. Computing device may then be configured to retrieve multiple data objects from the photos which may correspond to user profile 116. Processor 108 or computing device may receive and process the data submission in any way described in this disclosure. As used in this disclosure, a "documentation" is a source of information. In some cases, documentation may include electronic documents, such as, without limitation, txt file, JSON file, word document, pdf file, excel sheet, image, video, audio, and the like thereof. In a non-limiting example, documentation may include user profile 116.

With continued reference to FIG. 1, in some embodiments, receiving user profile 116 may include accepting a smart assessment 120 from the user. As used in this disclosure, a "smart assessment" is a set of requests or questions that asks for a user's information, such as the user profile 116, wherein each question contains answers that influences user authentication, verification, and any processing step described in this disclosure. In some embodiments, questions or prompts within smart assessment 120 contain open ended questions, or a free input, in which a user is required to answer. In some embodiments, Smart assessment 120 may include a question or prompt followed by a plurality of answers in which a user may select from. The plurality of answers may be chosen from a drop-down menu. the plurality of answers may be a range of answers, in which a user may be required to select the range that falls within their desired input. In some embodiments, plurality of answers may contain a sliding scale in which a user may slide the scale to the preferred numerical result. In a non-limiting example, smart assessment 120 may include a question asking the user regarding the user's income; wherein the question may ask "what is your yearly income?". Continuing in the example, the user may input their income or select their income from a plurality of answers. In some embodiments, Smart assessment 120 may take the form of an interview, a report, an interactive software, a virtual meeting or interview, event monitoring, and the like thereof. In some embodiments, smart assessment 120 may include data submission of one or more documentations from the user as described above.

Still referring to FIG. 1, smart assessment 120 may include one or more event handlers. An "event handler" as used in this disclosure is a callback routine that operates asynchronously once an event takes place. Event handlers may include, without limitation, one or more programs to perform one or more actions based on user input, such as generating pop-up windows, submitting forms, requesting more information, and the like. For example, an event handler may be programmed to request more information or may be programmed to generate messages following a user input. User input may include clicking buttons, mouse clicks, hovering of a mouse, input using a touchscreen, keyboard clicks, an entry of characters, entry of symbols, an upload of an image, an upload of a computer file, manipulation of computer icons, and the like. For example, an event handler may be programmed to generate a notification screen following a user input such as inputting characters into a computer. In some embodiments, an event handler may be programmed to request additional information after a first user input is received. In some embodiments, an event handler may be programmed to generate a pop-up notification when a user input is left blank. In some embodiments, an event handler may be programmed to generate requests based on the user input.

Still referring to FIG. 1, memory 112 may further contain instructions configuring the at least a processor 108 to determine a pecuniary health 128 as a function of the user profile 116. "Pecuniary health" as described in this disclosure is a data structure representing a user's financial performance or financial status based on user profile 116. As a non-limiting example, pecuniary health 128 may be a numerical value wherein the numerical value indicates a user's financial health when compared to a predetermined range of values. As another non-limiting example, Pecuniary health 128 may indicate that based on user profile 116, a user's financial health is poor and requires attention when compared to a predetermined range of values. Pecuniary health 128 may consist of a datum or data wherein the data corresponds to the pecuniary health 128 of a user. Pecuniary health 128 may consist of plurality of data wherein each set of data corresponds to a specific category of user profile. For example, Pecuniary health 128 may contain data relating to a user's financial performance with respect to income and another data relating to a user's financial performance with respect to the user's assets. Pecuniary health 128 may be a numerical value based on a range of values. For example, pecuniary health 128 may contain a numerical value of 100 on a scale of 1-100 wherein the pecuniary health 128 indicates that a user's pecuniary health 128 may be very healthy. Pecuniary health 128 may also include multiple levels wherein each level is representative of a user's pecuniary health 128. For example, a level of 1 or "high" may indicate that a user's pecuniary health 128 is quite healthy while a score of 5 or "low" may indicate that a user's pecuniary health 128 may need more care. Pecuniary health 128 may further include notifications about the user's pecuniary health 128.

Still referring to FIG. 1, pecuniary health 128 may be comprised of a plurality of health scores. A plurality of health scores as described in this disclosure is a plurality of pecuniary health 128 in which each pecuniary health 128 corresponds to a particular datum, set of data, or category within the user profile 116. As a non-limiting example, plurality of health scores may contain one pecuniary health 128 based on a user's asset information indicated in the user profile 116 and a second health score based on a user's financial obligation information present in user profile 116.

Still referring to FIG. 1, pecuniary health 128 may be generated by determining a plurality of health scores and determining the pecuniary health as a function of the plurality of health scores. Determining the pecuniary health as a function of the plurality of health scores may include generating an average of the plurality of health scores. In some embodiments, determining the pecuniary health as a function of the plurality of health scores may include generating a weighted average of the plurality of health scores. In some embodiments, pecuniary health 128 may be an aggregate of plurality of health scores.

Still referring to FIG. 1, memory 112 contains instructions configuring processor 108 to obtain a plurality of pecuniary approach blocks 132. "Pecuniary approach block" as described in this disclosure is a step in a pecuniary-related activity. For example, a pecuniary approach block may include income/expense tracking or tax preparation. Each pecuniary approach block may refer to an individual step in a plurality of steps in plurality of pecuniary approach blocks 132. Plurality of pecuniary approach blocks 132 may include steps relating to, without limitation, income/expense tracking, tax preparation, debt management, investing, property management, stock management, IP licensing management, legal procedures and guidelines for pecuniary-related activities, tax deductions, charitable deductions, and the like. Steps relating to income/expense tracking may include steps such as calculating income, calculating medical expenses, calculating car payments, calculating insurance payments, calculating income from dividends, property and the like, and the like. Steps related to income/express tracking may further include steps categorizing the various the various forms of income and expenses. As a non-limiting example, car payments, car insurance payments, weekly gas fill-ups and the like may be categorized into a vehicle expense category. In an embodiment, steps relating to tax preparation may include steps such as gathering incomes and expenses, optimizing deductions, filing taxes, and the like. In some embodiments steps relating to debt management may include steps such as minimizing expenses, paying off loans, prioritizing higher interest loans, increasing income from assets, and the like. In some embodiments, steps relating to investing may include, calculating investible income, determining investments with higher rates of return, managing current investments and the like. Steps relating to property management may include managing mortgages, managing tenants, managing rental income, determining property worth, and the like. Plurality of pecuniary approach blocks 132 may be generated by professionals in finance such as, without limitation, finance associates, CPAs, real estate agents, bankers, and the like thereof. In some embodiments, plurality of pecuniary approach blocks 132 may be input into computing device by a user. Plurality of pecuniary approach blocks 132 may also be retrieved from database 136.

Still referring to FIG. 1, plurality of pecuniary approach blocks 132 may be obtained from a database 136. Database 136 may be implemented, without limitation, as a relational database 136, a key-value retrieval database such as a NOSQL database, or any other format or structure for use as a database that a person skilled in the art would recognize as suitable upon review of the entirety of this disclosure. Database 136 may alternatively or additionally be implemented using a distributed data storage protocol and/or data structure, such as a distributed hash table or the like. Database 136 may include a plurality of data entries and/or records as described above. Data entries in a database 136 may be flagged with or linked to one or more additional elements of information, which may be reflected in data entry cells and/or in linked tables such as tables related by one or more indices in a relational database 136. Persons skilled in the art, upon reviewing the entirety of this disclosure, will be aware of various ways in which data entries in a database 136 may store, retrieve, organize, and/or reflect data and/or records as used herein, as well as categories and/or populations of data consistently with this disclosure.

With continued reference to FIG. 1, in some embodiments, plurality of pecuniary approach blocks 132 may be generated. Plurality of pecuniary approach blocks 132 may be generated using a machine learning process similar to a machine learning process as described in this disclosure. Plurality of pecuniary approach blocks 132 may further be generated using classifiers as described in this disclosure wherein the plurality of pecuniary approach blocks 132 are generated by classifying preexisting data and generating blocks as a result of the classification. Generating the plurality of pecuniary approach blocks 132 may comprise receiving plurality pecuniary training data. plurality pecuniary training data may include a plurality of plurality of pecuniary approach blocks correlated to a plurality of user profiles. In some embodiments, plurality pecuniary training data may be received from a user, a third party, database 136, external computing devices, previous iterations of the function and/or the like. In some embodiments, plurality pecuniary training data may be stored in database 136. In some embodiments, plurality pecuniary training data may be retrieved from a database 136. In some embodiments, plurality of pecuniary approach blocks 132 may be stored in a database 136 and used as training data for future iterations. Similarly, training data may be created from previous iterations wherein a previous plurality of pecuniary approach blocks 132 was received and stored on a database 136. Generating the plurality of pecuniary approach blocks 132 may further include training a plurality pecuniary machine learning model as a function of the plurality pecuniary training data and generating the plurality of pecuniary approach blocks 132 as a function of the plurality pecuniary machine learning model. In some embodiments, outputs of plurality pecuniary machine learning model may be used to train plurality pecuniary training data.

Still referring to FIG. 1, memory 112 contains instructions configuring processor 108 to select at least one pecuniary approach block 140 from the plurality of pecuniary approach blocks 132 as a function of the user profile 116. Selecting the at least one pecuniary approach block 140 may include selecting the at least one pecuniary approach block 140 using a rule-based engine. Rule-based engine may include a pecuniary approach rule. As used in this disclosure, a "rule-based engine" is a system that executes one or more rules such as, without limitations, pecuniary approach rule, in a runtime production environment. As used in this disclosure, a "pecuniary approach rule" is a pair including a set of conditions and a set of actions, wherein each condition within the set of conditions is a representation of a fact, an antecedent, or otherwise a pattern, and each action within the set of actions is a representation of a consequent. In a non-limiting example, pecuniary approach rule may include a condition of "user inputs user target 124 corresponding to category x" pair with an action of "select at least one pecuniary approach block 140 within the category x." In some embodiments, rule-based engine may execute one or more pecuniary approach rules if any conditions within one or more pecuniary approach rules are met. As a non-limiting example, one or more pecuniary approach rules may be implemented if one or more user targets 124 are inputted. Data may include user profile 116 or any other data described in this disclosure, and the like. In a non-limiting example, a condition may be triggered by event handlers as described in this disclosure. In some embodiments, pecuniary approach rule may be stored in a database 136 as described in this disclosure.

With continued reference to FIG. 1, selecting at least one pecuniary approach block 140 may include selecting the at least one pecuniary approach block 140 using a machine learning model. Selecting the at least one pecuniary approach block 140 may comprise receiving approach training data. Approach training data may include a plurality of pecuniary approach blocks correlated to a plurality of user profiles. In some embodiments, approach training data may be received from a user, a third party, database 136, external computing devices, previous iterations of the function and/ or the like. In some embodiments, approach training data may be stored in a database 136. In some embodiments, approach training data may be retrieved from a database 136. In some embodiments, at least one approach block 140 may be stored in a database 136 and used as training data for future iterations. Similarly, training data may be created from previous iterations wherein a previous at least one pecuniary approach block 140 was received and stored on a database 136. Generating the at least one pecuniary approach block 140 may further include training an approach machine learning model as a function of the approach training data and generating the at least one pecuniary approach block as a function of the approach block machine learning model. In some embodiments, outputs of approach machine learning model may be used to train approach training data.

With continued reference to FIG. 1, selecting at least one pecuniary approach block 140 may include selecting the at least one pecuniary approach block 140 using a classifier. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 1, memory 112 contains instructions configuring processor 108 to generate at least one pecuniary plan 144 as a function of the at least one pecuniary approach block 140 and the user profile 116. A "Pecuniary plan," as used in this disclosure, is data describing a process of completing a pecuniary-related activity based on the user profile 116, particularly, the user target 124. In a non-limiting example, pecuniary plan for tax preparation may include data relating to gathering income sources and optimizing deductions. Pecuniary plan 144 may include a plurality of pecuniary approach blocks 132. In some embodiments, generating the at least one pecuniary plan 144 may include a plurality of pecuniary approach blocks 132 connected in a sequence. In some embodiments, pecuniary plan may include a predefined pecuniary plan. "Predefined pecuniary plan" as described in this disclosure is a pecuniary plan that has already been created. For example, predefined pecuniary plan may include a plurality of pecuniary approach blocks 132 that have already been connected in a sequence. Predefined pecuniary plan may be generated by professionals in finance such as, without limitation, finance associates, CPAs, real estate agents, bankers, and the like thereof. In some embodiments, plurality of pecuniary approach blocks 132 may be input into computing device by a user. Predefined pecuniary plan may also be retrieved from database 136. In some embodiments, a plurality of pecuniary plans may be generated. For example, if a user specifies a plurality of objectives, a plurality of pecuniary plans may be generated wherein each pecuniary plan may corresponds to each objective. In some embodiments, generating the at least one pecuniary plan 144 may include generating the at least one pecuniary plan 144 using a rule-based engine as described above. In some embodiments, generating the at least one pecuniary plan 144 may comprise generating the at least one pecuniary plan 144 using a machine learning module.

Still referring to FIG. 1, at least one pecuniary plan 144 may comprise a plurality of stages. Plurality of stages as defined in this disclosure is a plurality of steps or events needed to complete the pecuniary plan. Plurality of stages may include steps such as gathering income sources, optimizing deductions and the like as explained above.

Continuing to reference FIG. 1, processor 108 may use a machine learning module, such as pecuniary machine learning module, to implement one or more algorithms or generate one or more machine-learning models, such as pecuniary machine learning model 148, to calculate at least one pecuniary plan 144. However, the machine learning module is exemplary and may not be necessary to generate one or more machine learning models and perform any machine learning described herein. In one or more embodiments, one or more machine-learning models may be generated using training data. Training data may include inputs and corresponding predetermined outputs so that a machine-learning model may use correlations between the provided exemplary inputs and outputs to develop an algorithm and/or relationship that then allows machine-learning model to determine its own outputs for inputs. Training data may contain correlations that a machine-learning process may use to model relationships between two or more categories of data elements. Exemplary inputs and outputs may come from a database 136, such as any database 136 described in this disclosure, or be provided by a user. In other embodiments, a machine-learning module may obtain a training set by querying a communicatively connected database 136 that includes past inputs and outputs. Training data may include inputs from various types of databases, resources, and/or user inputs and outputs correlated to each of those inputs so that a machine-learning model may determine an output. Correlations may indicate causative and/or predictive links between data, which may be modeled as relationships, such as mathematical relationships, by machine-learning models, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements. Pecuniary machine learning module may be used to generate pecuniary machine learning model 148 and/or any other machine learning model using training data. Pecuniary machine learning model 148 may be trained by correlated inputs and outputs of training data. Training data may be data sets that have already been converted from raw data whether manually, by machine, or any other method. Pecuniary training data 152 may be stored in a database 136. Pecuniary training data 152 may also be retrieved from database 136.

With continued reference to FIG. 1, generating the at least one pecuniary plan 144 as a function of the at least one pecuniary approach block 140 and the user profile 116 may comprise receiving pecuniary training data 152. Pecuniary training data 152 may include a plurality of user profiles data and/or a plurality of pecuniary approach block data correlated to a plurality of pecuniary plan data. In some embodiments, pecuniary training data 152 may include a plurality of the at least one pecuniary approach blocks 140 correlated to a plurality of pecuniary plans. In some embodiments, pecuniary training data 152 may be received from a user, a third party, database 136, external computing devices, previous iterations of the function and/or the like. For the purposes of this disclosure, a "third party" is any person that is not a system user and/or external user that can provide feedback. As a non-limiting example, a third party may be a financial advisor, CPA, or the like as described above. In some embodiments, pecuniary training data 152 may be stored in a database 136. In some embodiments, pecuniary training data 152 may be retrieved from a database 136. In some embodiments, user profile 116 may be stored in a database 136 and used as training data for future iterations. Similarly, training data may be created from previous iterations wherein a previous user profile 116 was received and stored on a database 136. Generating the at least one pecuniary plan 144 may further include training a pecuniary plan machine learning model as a function of the pecuniary training data 152 and generating the at least one pecuniary plan 144 as a function of the pecuniary plan machine learning model. In a non-limiting example, pecuniary machine learning model can be to generate a particular pecuniary plan from the at least one pecuniary approach block 140 and user profile 116. In some embodiments, outputs of pecuniary machine learning model 148 may be used to train pecuniary training data 152.

With continued reference to FIG. 1, memory 112 may contain instructions configuring processor 108 to determine a pecuniary prediction 156 as a function of the user profile 116 and the at least one pecuniary plan 144. "Pecuniary prediction" as described in this disclosure is the pecuniary health 128 of a user if the at least one pecuniary plan 144 is implemented. For example, a user may contain a higher pecuniary health 128 after implementation of various at least pecuniary plans. Pecuniary prediction 156 may contain any elements contained in pecuniary health 128 described above in this disclosure. Pecuniary prediction 156 may further include a plurality of pecuniary predictions 156. Plurality of pecuniary predictions 156 may include a pecuniary prediction 156 as a function of each at least one pecuniary plan 144 that is implemented. As a non-limiting example, a user may contain a plurality of pecuniary predictions 156 wherein a first pecuniary prediction 156 may be based off of implementation of a first of the at least one pecuniary prediction 156 and a second pecuniary prediction 156 may be based off of implementation of a second of the at least one pecuniary prediction 156. Pecuniary prediction 156 may contain data indicating to a user that the user's pecuniary health 128 may increase based off of various implementation of the at least one pecuniary plan 144. Pecuniary prediction 156 may further determine future predictions. "Prediction" as defined in this disclosure is a guess, assumption, forecasted result about an event in the future. For example, computing device may generate predictions of a user's future pecuniary health 128 based on the user profile 116. In some embodiments, pecuniary prediction 156 may contain data predicting a user's pecuniary health 128 based on the user profile 116. For example, pecuniary health 128 of a user may be lower in the future due to increasing financial obligations. Pecuniary prediction 156 may further contain a range of predictions wherein the range of predictions vary as a function of time. For example, pecuniary prediction 156 may contain a specific pecuniary health 128 at one point in time and another pecuniary health 128 at another point in time. Pecuniary prediction 156 may be linear as a function of time wherein the pecuniary prediction 156 linearly increases or decreases as time increases. Pecuniary prediction 156 may be determined using a machine learning model as described in this disclosure.

With continued reference to FIG. 1, determining the pecuniary prediction 156 as a function of the at least one pecuniary plan 144 and the user profile 116 may comprise receiving pecuniary prediction training data. Pecuniary prediction training data may include a plurality of pecuniary plans correlated to a plurality of pecuniary predictions. In some embodiments, pecuniary prediction training data may include a plurality of the at least one user profiles 116 correlated to a plurality of pecuniary predictions. In some embodiments, pecuniary prediction training data may be received from a user, a third party, database 136, external computing devices, previous iterations of the function and/or the like. For the purposes of this disclosure, a "third party" is any person that is not a system user and/or external user that can provide feedback. As a non-limiting example, a third party may be a financial advisor, CPA, or the like as described above. In some embodiments, pecuniary prediction training data may be stored in a database 136. In some embodiments, pecuniary prediction training data may be retrieved from a database 136. In some embodiments, user profile 116 and pecuniary plan may be stored in a database 136 and used as training data for future iterations. Similarly, training data may be created from previous iterations wherein a previous user profile 116 was received and stored on a database 136. determining pecuniary may further include training a pecuniary prediction machine learning model as a function of the pecuniary prediction training data and generating the pecuniary prediction as a function of the pecuniary prediction machine learning model. In some embodiments, outputs of pecuniary prediction machine learning model may be used to train pecuniary prediction training data.

With continued reference to FIG. 1, apparatus 100 further comprises a user interface communicatively connected to the processor 108. User interface 160 is configured to display the at least one pecuniary plan 144. For the purposes of the disclosure "user interface" is a means by which a user interacts with a computer system. For example, a user may interact through the use of a software and an input device such as a keyboard. A user interface 160 may include a graphical user interface (GUI). Graphical user interface may include, without limitation a form, or other graphical element having data entry fields, wherein one or more users, may enter information describing one or more user preferences and selections as described in more detail below. Fields in graphical user interface may provide, for instance in "drop-down" lists, where users may be able to select one or more entries to indicate their preference and/or selections. Fields may include free-form entry fields such as text-entry fields where a user may be able to type or otherwise enter text. In some embodiments, a user may interact with user interface 160 wherein user may accept or reject pecuniary plans that were generated. As a result, a pecuniary prediction may be updated. In some embodiments, User may interact with user interface 160 wherein user may choose a pecuniary plan based on a plurality of pecuniary plans that were generated and displayed on user interface 160. User may choose a pecuniary plan that best suits their current needs. In some embodiments, user interface 160 may further be configured to display pecuniary health 128 and pecuniary prediction.

With continued reference to FIG. 1, memory 112 may further contain instruction configuring processor 108 to generate a pecuniary checklist as a function of the pecuniary plan. Pecuniary checklist as described in this disclosure is a visual list containing pecuniary-related steps or goals that need to be accomplished. Pecuniary checklist may be virtual on a user display. Pecuniary checklist may also be physical in the form of writing on a paper. Pecuniary checklist may comprise multiple steps to achieve a larger goal. For example, pecuniary checklist may include the pecuniary plan wherein each step may be correlated to the at least one pecuniary approach block 140 of a plurality of pecuniary approach blocks 132. Pecuniary checklist may be displayed on user interface 160 wherein a user may interact with checklist. User may interact with pecuniary checklist such that user may input into pecuniary checklist various steps have been accomplished.

Figure 2:
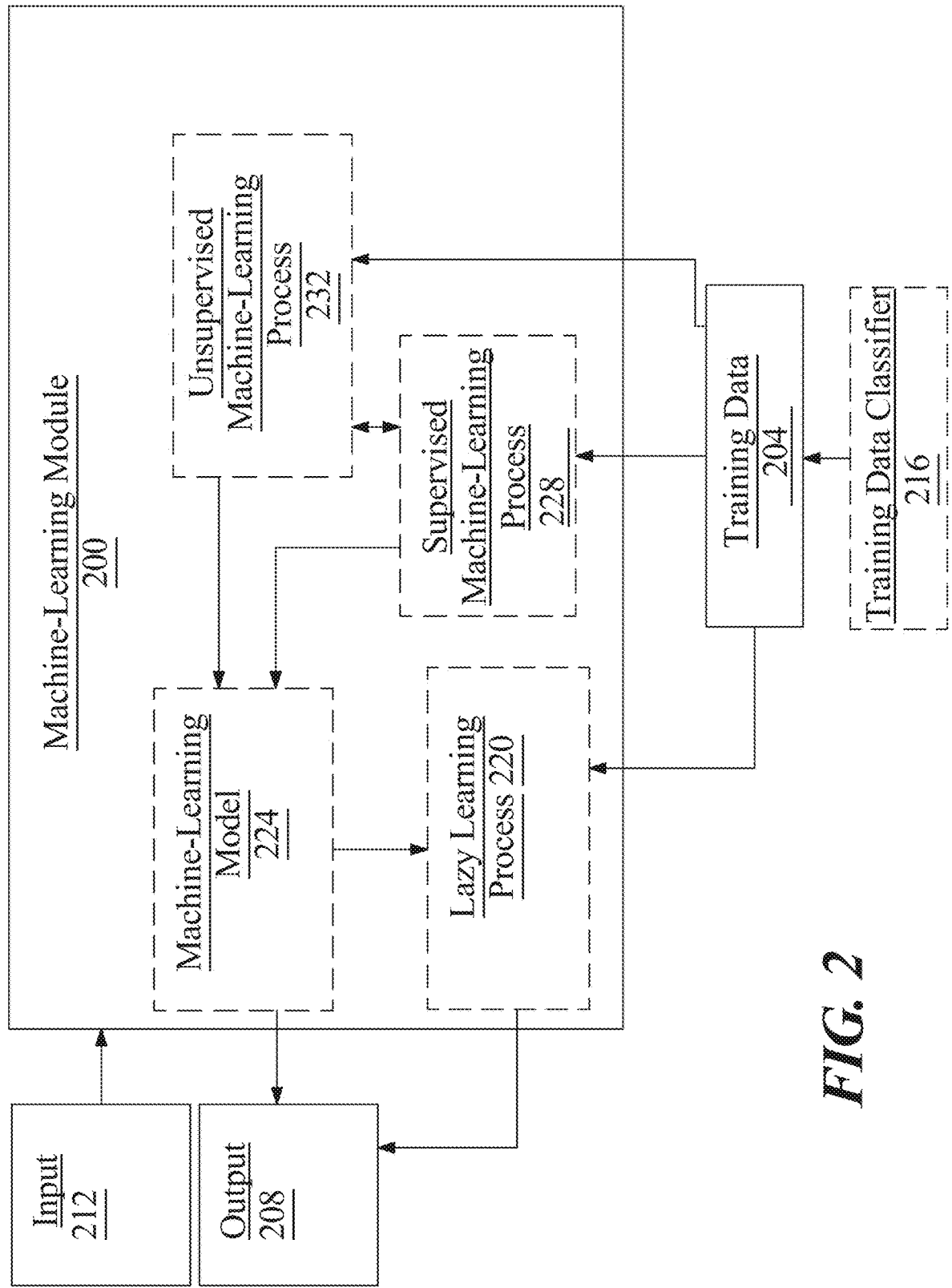
FIG. 2 is a block diagram of exemplary embodiment of a machine learning module.

Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 204 to generate an algorithm that will be performed by apparatus 100/module to produce outputs 208 given data provided as inputs 212; this is in contrast to a non-machine learning software program where the commands to be executed are determined in advance by a user and written in a programming language.

With continued reference to FIG. 2, for instance, and without limitation, training data 204 may include a plurality of data entries, each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and with continued reference to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure.

With continued reference to FIG. 2, training data may be filtered, sorted, and/or selected using one or more supervised and/or unsupervised machine-learning processes and/or models as described in further detail below; such models may include without limitation a training data classifier 218. Training data classifier 218 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 200 may generate a classifier using a classification algorithm, defined as a process whereby apparatus 100 and/or any module and/or component operating thereon derives a classifier from training data 204. Classification may be performed using, without limitation, linear classifiers such as without limitation logistic regression and/or naïve Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

With continued reference to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a mathematical and/or algorithmic representation of a relationship between inputs and outputs, as generated using any machine-learning process including without limitation any process as described above and stored in memory 112; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

With continued reference to FIG. 2, machine-learning algorithms may include at least a supervised machine-learning process 228. At least a supervised machine-learning process 228, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include inputs and outputs, as described above, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

With continued reference to FIG. 2, machine learning processes may include at least an unsupervised machine-learning processes 222. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

With continued reference to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the LASSO model is the Frobenius norm amounting to the square root of the sum of squares of all terms. Linear regression models may include the elastic net model, a multi-task elastic net model, a least angle regression model, a LARS LASSO model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

With continued reference to FIG. 2, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Figure 3:
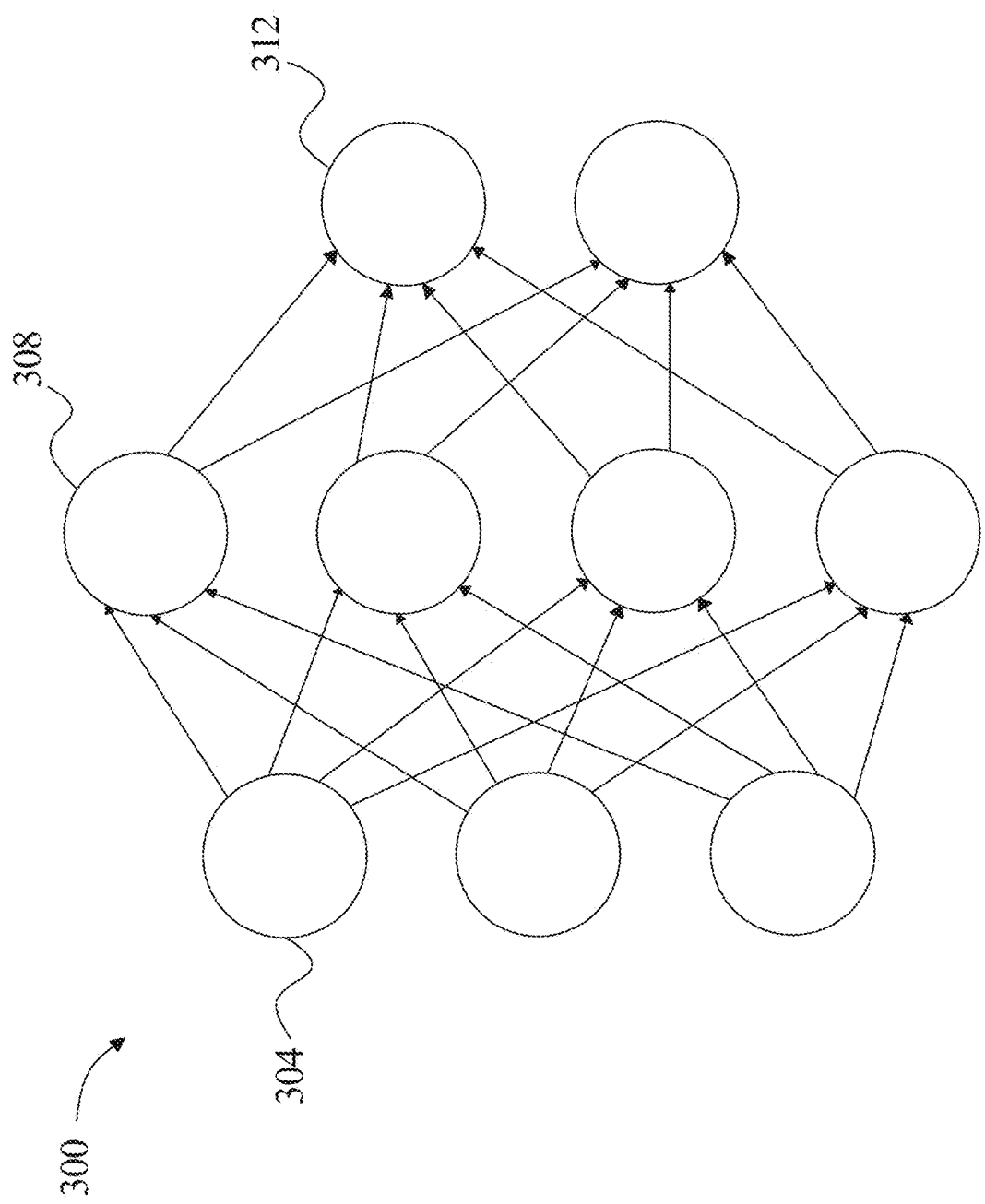
FIG. 3 is a diagram of an exemplary embodiment of a neural network.

Referring now to FIG. 3, an exemplary embodiment of neural network 300 is illustrated. A neural network 300 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 304, one or more intermediate layers 308, and an output layer of nodes 312. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 4:
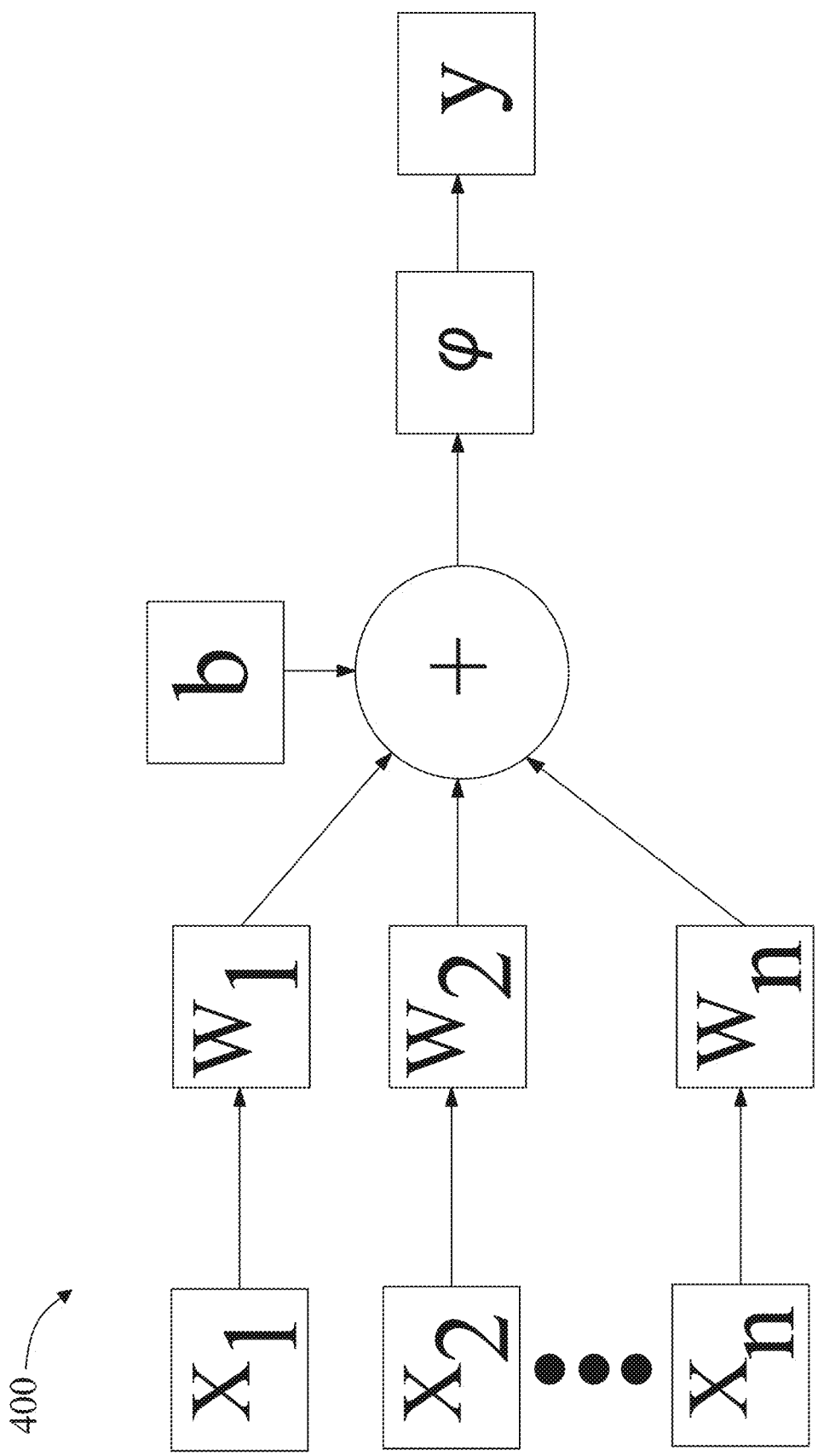
FIG. 4 is a block diagram of an exemplary embodiment of a node.

Referring now to FIG. 4, an exemplary embodiment of a node of a neural network is illustrated. A node may include, without limitation, a plurality of inputs xi that may receive numerical values from inputs to a neural network containing the node and/or from other nodes. Node may perform a weighted sum of inputs using weights wi that are multiplied by respective inputs xi. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight wi applied to an input xi may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight.

Figure 5:
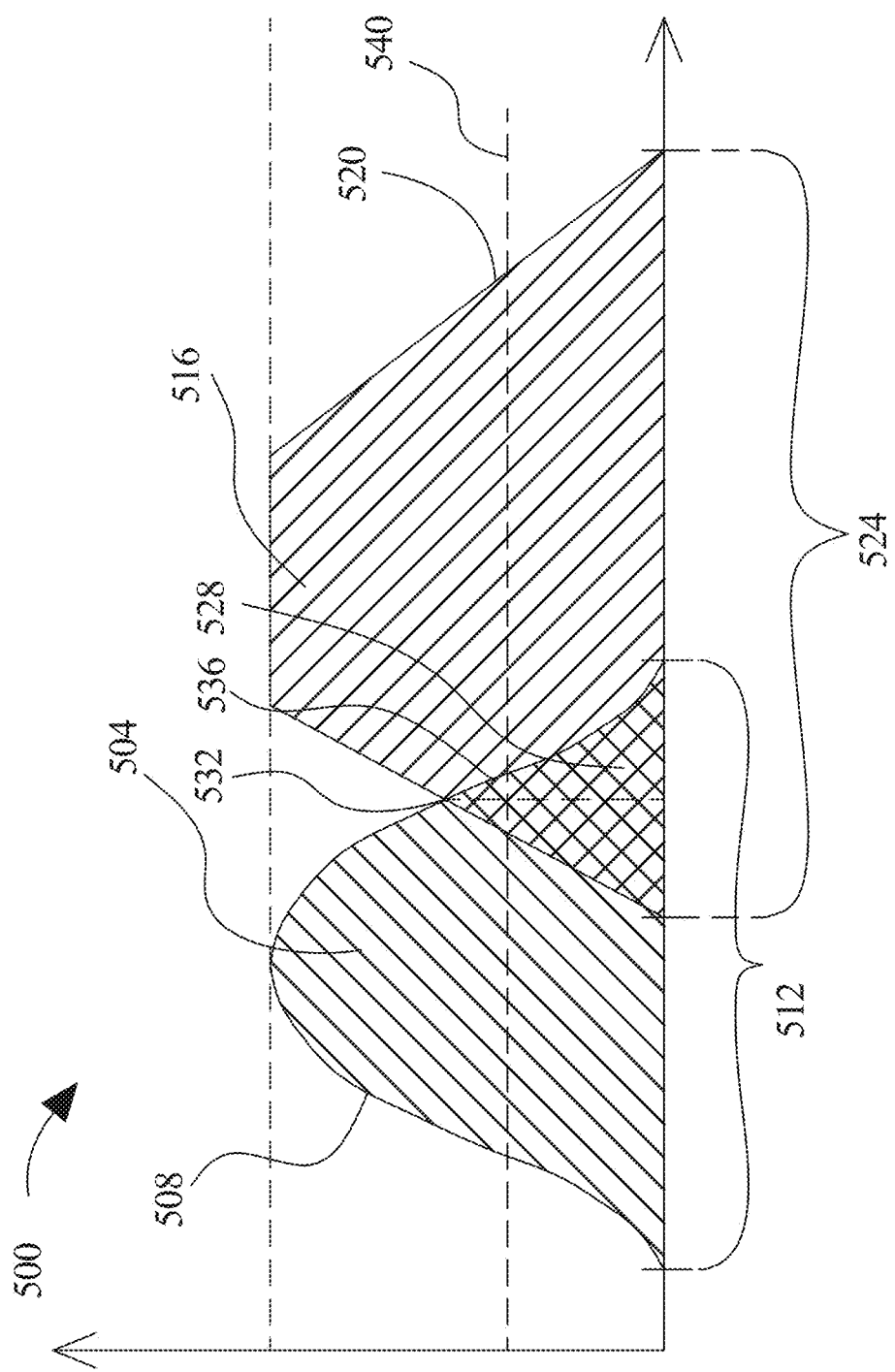
FIG. 5 is a diagram of an exemplary embodiment of fuzzy set comparison.

Referring now to FIG. 5, an exemplary embodiment of fuzzy set comparison 500 is illustrated. A first fuzzy set 504 may be represented, without limitation, according to a first membership function 508 representing a probability that an input falling on a first range of values 512 is a member of the first fuzzy set 504, where the first membership function 508 has values on a range of probabilities such as without limitation the interval [0,1], and an area beneath the first membership function 508 may represent a set of values within first fuzzy set 504. Although first range of values 512 is illustrated for clarity in this exemplary depiction as a range on a single number line or axis, first range of values 512 may be defined on two or more dimensions, representing, for instance, a Cartesian product between a plurality of ranges, curves, axes, spaces, dimensions, or the like. First membership function 508 may include any suitable function mapping first range 512 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, \text{ for } x > c \text{ and } x < a \\ \frac{x-a}{b-a}, \text{ for } a \leq x < b \\ \frac{c-x}{c-b}, \text{ if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}(\frac{x-c}{\sigma})^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

With continued reference to FIG. 5, first fuzzy set 504 may represent any value or combination of values as described above, including output from one or more machine-learning models and/or a predetermined class. A second fuzzy set 515, which may represent any value which may be represented by first fuzzy set 504, may be defined by a second membership function 520 on a second range 524; second range 524 may be identical and/or overlap with first range 512 and/or may be combined with first range via Cartesian product or the like to generate a mapping permitting evaluation overlap of first fuzzy set 504 and second fuzzy set 515. Where first fuzzy set 504 and second fuzzy set 515 have a region 528 that overlaps, first membership function 508 and second membership function 520 may intersect at a point 572 representing a probability, as defined on probability interval, of a match between first fuzzy set 504 and second fuzzy set 515. Alternatively or additionally, a single value of first and/or second fuzzy set may be located at a locus 575 on first range 512 and/or second range 524, where a probability of membership may be taken by evaluation of first membership function 508 and/or second membership function 520 at that range point. A probability at 528 and/or 572 may be compared to a threshold 540 to determine whether a positive match is indicated. Threshold 540 may, in a non-limiting example, represent a degree of match between first fuzzy set 504 and second fuzzy set 515, and/or single values therein with each other or with either set, which is sufficient for purposes of the matching process; for instance, threshold may indicate a sufficient degree of overlap between an output from one or more machine-learning models and/or a predetermined class for combination to occur as described above. Alternatively or additionally, each threshold may be tuned by a machine-learning and/or statistical process, for instance and without limitation as described in further detail below.

With continued reference to FIG. 5, in an embodiment, a degree of match between fuzzy sets may be used to classify any data described as classified above. Where multiple fuzzy matches are performed, degrees of match for each respective fuzzy set may be computed and aggregated through, for instance, addition, averaging, or the like, to determine an overall degree of match.

With continued reference to FIG. 5, in an embodiment, an element of data may be compared to multiple fuzzy sets. For instance, the element of data may be represented by a fuzzy set that is compared to each of the multiple fuzzy sets representing, e.g., values of a linguistic variable; and a degree of overlap exceeding a threshold between the datum-linked fuzzy set and any of the multiple fuzzy sets may cause computing device to classify the datum as belonging to each such categorization. Machine-learning methods as described throughout may, in a non-limiting example, generate coefficients used in fuzzy set equations as described above, such as without limitation x, c, and σ of a Gaussian set as described above, as outputs of machine-learning methods.

With continued reference to FIG. 5, a computing device may use a logic comparison program, such as, but not limited to, a fuzzy logic model to determine an output and/or response. An output and/or response may include, but is not limited to low, medium, advanced, superior, good, bad, and the like; each such output and/or response may be represented as a value for a linguistic variable representing output and/or response or in other words a fuzzy set as described above that corresponds to a degree of completion as calculated using any statistical, machine-learning, or other method that may occur to a person skilled in the art upon reviewing the entirety of this disclosure.

With continued reference to FIG. 5, an inference engine may be implemented according to input and/or output membership functions and/or linguistic variables. For instance, a first linguistic variable may represent a first measurable value pertaining to an element being input to the inferencing system while a second membership function may indicate a degree and/or category of one or more other attributes and/or values that may be associated with a system user. Continuing the example, an output linguistic variable may represent, without limitation, a value representing a strength and/or deficiency. An inference engine may combine rules the degree to which a given input function membership matches a given rule may be determined by a triangular norm or "T-norm" of the rule or output membership function with the input membership function, such as min (a, b), product of a and b, drastic product of a and b, Hamacher product of a and b, or the like, satisfying the rules of commutativity (T(a, b)=T(b, a)), monotonicity: (T(a, b)≤T(c, d) if a≤c and b≤d), (associativity: T(a, T(b, c))=T(T(a, b), c)), and the requirement that the number 1 acts as an identity element. Combinations of rules ("and" or "or" combination of rule membership determinations) may be performed using any T-conorm, as represented by an inverted T symbol or "⊥," such as max(a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively or additionally, output rules may be replaced with functions according to the Takagi-Sugeno-King (TSK) fuzzy model.

Figure 6:
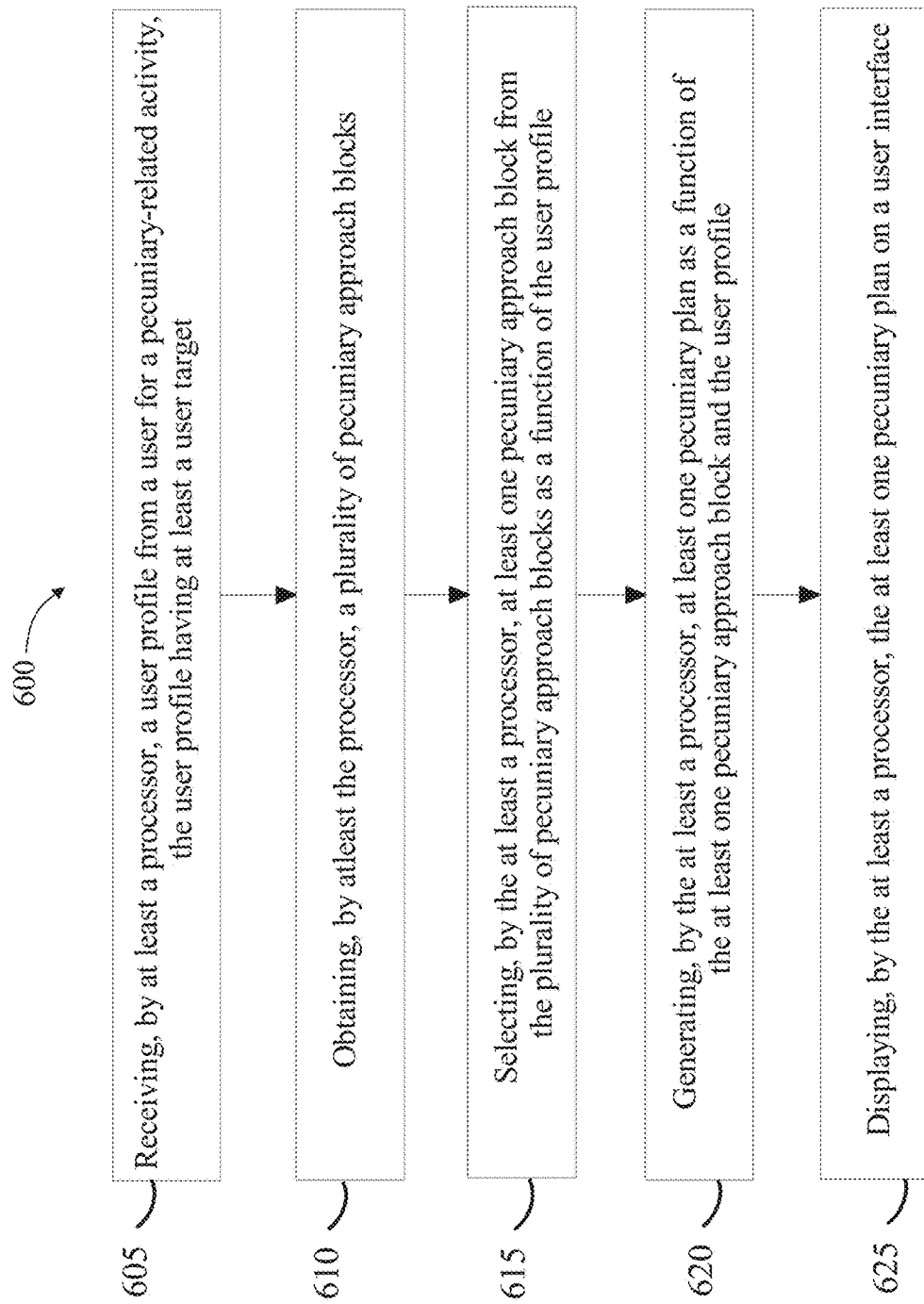
FIG. 6 is a flow diagram illustrating an exemplary embodiment of a method for modular completion of a pecuniary-related activity.

Referring now to FIG. 6, a flow diagram of a method for modular competition of a pecuniary-related activity is illustrated. At step 605, method 600 includes receiving, by at least a processor, a user profile from a user for a pecuniary-related activity, the user profile having at least a user target. In some embodiments, receiving the user profile from a user for a pecuniary-related activity comprises receiving the user profile through a smart assessment. Further in some embodiments a pecuniary health may be determined by the at least a processor as a function of the user profile. In some embodiments, the pecuniary health may comprise a plurality of health scores. This may be implemented with reference to FIGS. 1-6

With continued reference to FIG. 6, at step 610, method includes obtaining, by the at least a processor, a plurality of pecuniary approach blocks. In some embodiments, obtaining, by the at least a processor, the plurality of pecuniary approach blocks comprises obtaining the plurality of pecuniary approach blocks from a database. This may be implemented with reference to FIGS. 1-6

With continued reference to FIG. 6, at step 615, selecting, by the at least a processor, at least one pecuniary approach block from the plurality of pecuniary approach blocks as a function of the user profile. In some embodiments, the at least one pecuniary plan comprises a plurality of stages. This may be implemented with reference to FIGS. 1-6

With continued reference to FIG. 6, at step 620 generating, by the at least a processor, at least one pecuniary plan as a function of the at least one pecuniary approach block and the user profile. In some embodiments, generating, by the at least a processor, the at least one pecuniary plan as a function of the user profile comprises, receiving pecuniary training data comprising a plurality of user profiles correlated to a plurality of the at least one pecuniary plan, training a pecuniary machine learning model as a function of the pecuniary training data and generating the at least one pecuniary plan using the pecuniary machine learning model. In some embodiments, a pecuniary prediction may be determined, by the at least a processor as a function of the user profile and the pecuniary plan. In some embodiments, determining, by the at least a processor, the pecuniary prediction as a function of the user profile and the pecuniary plan comprises, receiving pecuniary prediction training data comprising a plurality of user profiles and a plurality of the at least one pecuniary plan correlated to a plurality of pecuniary predictions, training a pecuniary prediction machine learning model as a function of the pecuniary prediction training data, and generating the pecuniary prediction using the pecuniary prediction machine learning model. This may be implemented with reference to FIGS. 1-6

With continued reference to FIG. 6, at step 625, displaying, by the at least a processor 108, the at least one pecuniary plan on a user interface. In some embodiments, a pecuniary checklist may be generated by the at least a processor, as a function of the pecuniary plan. This may be implemented with reference to FIGS. 1-6.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
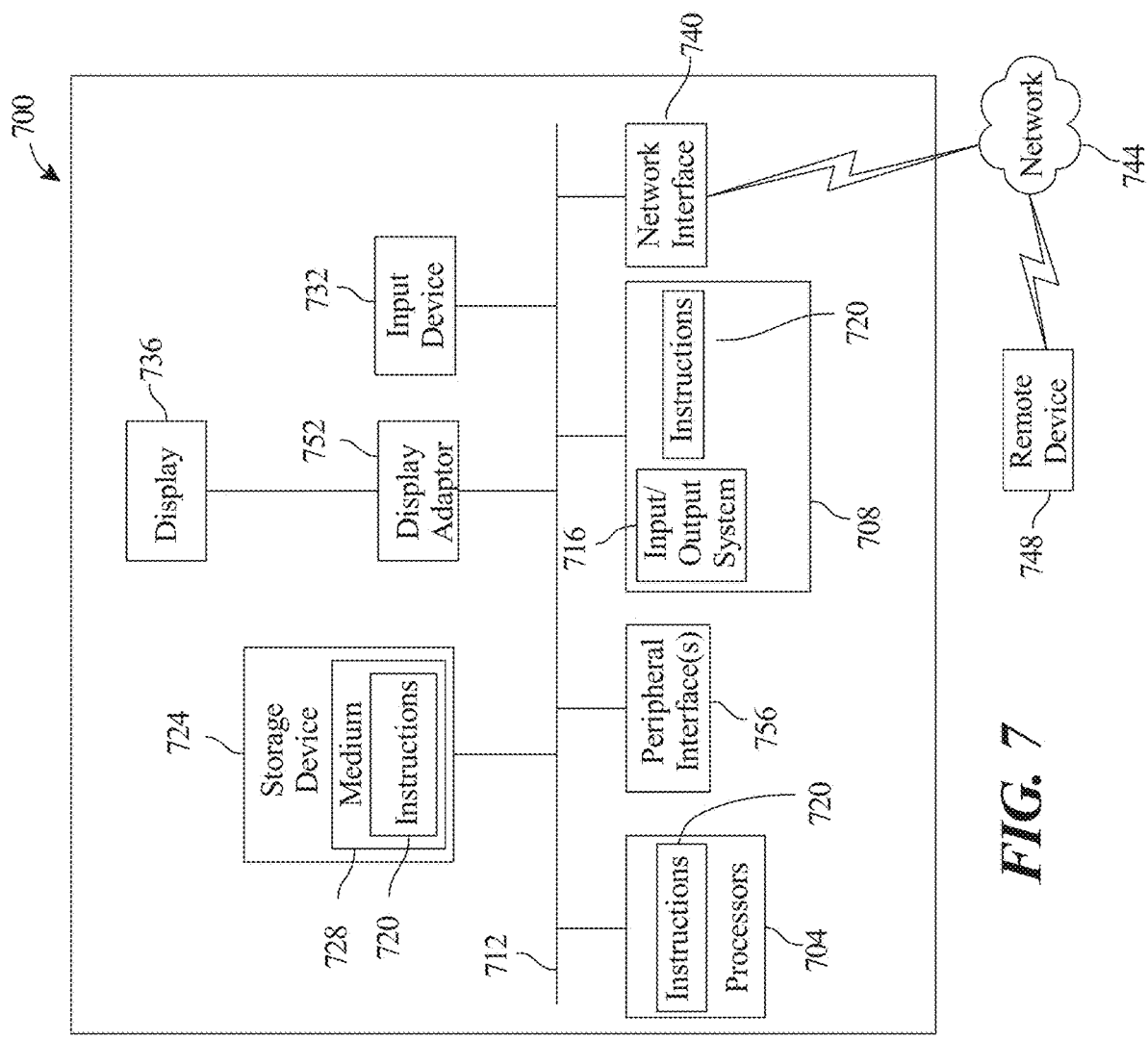
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. An apparatus for modular completion of a pecuniary-related activity, the apparatus comprising:

at least a processor; and
a memory communicatively connected to the at least a processor, the memory containing instructions configuring the at least a processor to:
  receive a user profile from a user for a pecuniary-related activity, the user profile having at least a user target;
  obtain a plurality of pecuniary approach blocks;
  select at least one pecuniary approach block from the plurality of pecuniary approach blocks as a function of the user profile;
  generate at least one pecuniary plan as a function of the at least one pecuniary approach block and the user profile wherein generating the at least one pecuniary plan further comprises:
    training a pecuniary machine learning model using pecuniary training data, wherein the pecuniary training data comprises at least a plurality of user profiles correlated to at least a plurality of the at least one pecuniary plan;
    generating, using the trained pecuniary machine learning model, the at least one pecuniary plan;
    update the training data as a function of the at least a plurality of user profiles correlated to the at least a plurality of the at least one pecuniary plan;
    retraining the pecuniary machine learning model with an updated pecuniary training data wherein the updated training data further comprises applying weighted values to the at least a plurality of user profiles to adjacent layers of the at least a plurality of the at least one pecuniary plan;
    determine, using the retrained machine learning model, a plurality of pecuniary predictions as a function of the user profile and trained pecuniary machine learning model;
a user interface communicatively connected to the processor, the user interface configured to display the at least one pecuniary plan and the plurality of pecuniary predictions.

2. The apparatus of claim 1, wherein receiving the user profile from a user for a pecuniary-related activity comprises receiving the user profile through a smart assessment.

3. The apparatus of claim 1, wherein the memory further contains instructions configuring the at least a processor to generate a pecuniary health as a function of the user profile.

4. The apparatus of claim 3, wherein generating the pecuniary health further comprises:
  determining a plurality of health scores; and
  determining the pecuniary health as a function of the plurality of health scores.

5. The apparatus of claim 1, wherein obtaining a plurality of pecuniary approach blocks comprises obtaining the plurality of pecuniary approach blocks from a database.

6. The apparatus of claim 1, wherein the at least one pecuniary plan comprises a plurality of stages.

7. The apparatus of claim 1, wherein the memory further contains instructions configuring the processor to determine a pecuniary prediction as a function of the user profile and the pecuniary plan.

8. The apparatus of claim 7, wherein determining the pecuniary prediction as a function of the user profile and the pecuniary plan comprises:
  receiving pecuniary prediction training data comprising a plurality of user profiles and a plurality of the at least one pecuniary plan correlated to a plurality of pecuniary predictions;
  training a pecuniary prediction machine learning model as a function of the pecuniary prediction training data; and
  generating the pecuniary prediction using the pecuniary prediction machine learning model.

9. The apparatus of claim 1, the memory further containing instructions to generate a pecuniary checklist as a function of the pecuniary plan.

10. A method for modular completion of a pecuniary-related activity, the method comprising:
  receiving, by at least a processor, a user profile from a user for a pecuniary-related activity, the user profile having at least a user target;
  obtaining, by at least the processor, a plurality of pecuniary approach blocks;
  selecting, by the at least a processor, at least one pecuniary approach block from the plurality of pecuniary approach blocks as a function of the user profile;
  generating, by the at least a processor, at least one pecuniary plan as a function of the at least one pecuniary approach block and the user profile wherein generating the at least one pecuniary plan further comprises:
    training a pecuniary machine learning model using pecuniary training data, wherein the pecuniary training data comprises at least a plurality of user profiles correlated to at least a plurality of the at least one pecuniary plan;
    generating, using the trained pecuniary machine learning model, the at least one pecuniary plan;
    update the training data as a function of the at least a plurality of user profiles correlated to the at least a plurality of the at least one pecuniary plan;
    retraining the pecuniary machine learning model with an updated pecuniary training data wherein the updated training data further comprises applying weighted values to the at least a plurality of user profiles to adjacent layers of the at least a plurality of the at least one pecuniary plan;
  determining, by the retrained machine learning model, a plurality of pecuniary predictions as a function of the user profile and trained pecuniary machine learning model; and
  displaying, by the at least a processor, the at least one pecuniary plan and the plurality of pecuniary predictions on a user interface.

11. The method of claim 10, wherein receiving the user profile from a user for a pecuniary-related activity comprises receiving the user profile through a smart assessment.

12. The method of claim 10, the method further comprising, determining by the at least a processor, a pecuniary health as a function of the user profile.

13. The method of claim 10, wherein the at least one pecuniary plan comprises a plurality of health scores.

14. The method of claim 10, wherein obtaining, by the at least a processor, the plurality of pecuniary approach blocks comprises obtaining the plurality of pecuniary approach blocks from a database.

15. The method of claim 10, wherein the at least one pecuniary plan comprises a plurality of stages.

16. The method of claim 10, the method further comprising determining, by the at least a processor, a pecuniary prediction as a function of the user profile and the pecuniary plan.

17. The method of claim 16, wherein determining, by the at least a processor, the pecuniary prediction as a function of the user profile and the pecuniary plan comprises:

receiving pecuniary prediction training data comprising a plurality of user profiles and a plurality of the at least one pecuniary plan correlated to a plurality of pecuniary predictions;

training a pecuniary prediction machine learning model as a function of the pecuniary prediction training data; and generating the pecuniary prediction using the pecuniary prediction machine learning model.

18. The method of claim 10, the method further comprising generating, by the at least a processor, a pecuniary checklist as a function of the pecuniary plan.

* * * * *